US012638427B2

(12) United States Patent
Kirk

(10) Patent No.: US 12,638,427 B2
(45) Date of Patent: May 26, 2026

(54) METHODS AND SYSTEMS FOR ESTIMATING GAS SUPPLY PRESSURE

(71) Applicant: Agilent Technologies, Inc., Santa Clara, CA (US)

(72) Inventor: Steven Kirk, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 381 days.

(21) Appl. No.: 18/448,827

(22) Filed: Aug. 11, 2023

(65) Prior Publication Data

US 2025/0052731 A1     Feb. 13, 2025

(51) Int. Cl.
*G01N 30/86* (2006.01)
*G01N 30/20* (2006.01)
*G01N 30/02* (2006.01)

(52) U.S. Cl.
CPC ......... *G01N 30/8665* (2013.01); *G01N 30/20* (2013.01); *G01N 2030/025* (2013.01)

(58) Field of Classification Search
None
See application file for complete search history.

(56) References Cited

U.S. PATENT DOCUMENTS 4,994,096 A     2/1991   Klein et al.
7,258,132 B2 *  8/2007   Henderson ......... G05D 16/2013
                                           73/23.36

8,352,087 B2     1/2013   Yli-Koski
2011/0308298 A1  12/2011  Magni et al.
2015/0159576 A1  6/2015   Surnilla et al.
2019/0195839 A1  6/2019   Masuda et al.
2020/0096487 A1* 3/2020   Schmidt .............. G05D 16/206
2023/0003700 A1  1/2023   Yamane et al.

FOREIGN PATENT DOCUMENTS

CN     115066608 A    9/2022
DE     69029162 T2    5/1997
EP     0 396 884 A2   11/1990
EP     2 389 579      11/2011
            (Continued)

OTHER PUBLICATIONS

Augenblick et al: "Electronic Flow Control: A New Level of Automation for Gas Chromatography", Published in Hewlett-Packard Journal on Jan. 1, 1983, pp. 35-39, vol. 34, No. 1.
(Continued)

*Primary Examiner* — Daniel S Larkin
(74) *Attorney, Agent, or Firm* — Foley & Lardner LLP

(57)     ABSTRACT

Methods and systems for estimating gas supply pressure are described herein. The method can include measuring a runtime valve duty cycle for a valve of a gas chromatography system. The method can include estimating a runtime supply pressure from the runtime valve duty cycle and at least one of a runtime flow rate or downstream pressure based on one or more calibration valve duty cycles corresponding to one or more calibration supply pressures and one or more calibration flow rates. The method can include, responsive to determining the runtime supply pressure is greater than a threshold supply pressure value, generating a notification that the runtime supply pressure is greater than the threshold supply pressure value.

20 Claims, 4 Drawing Sheets

(56)         References Cited

FOREIGN PATENT DOCUMENTS

| JP | H318756 | A |   | 1/1991 |
|----|----|----|----|----|
| JP | 08271493 | A | * | 10/1996 |
| JP | 2997293 | B2 |   | 1/2000 |
| JP | 4321307 | B2 |   | 8/2009 |
| WO | WO-2010/084517 | A1 |   | 7/2010 |
| WO | WO-2021/171550 |   |   | 9/2021 |

OTHER PUBLICATIONS

International Search Report and Written Opinion issued in International Application No. PCT/US2024/033406 dated Sep. 30, 2024 (13 Pages).

* cited by examiner

300

MEASURE CALIBRATION VALVE
DUTY CYCLES — 305

MEASURE RUNTIME VALVE DUTY CYCLE — 310

ESTIMATE RUNTIME SUPPLY PRESSURE — 315

DETERMINE RUNTIME SUPPLY PRESSURE IS GREATER THAN THRESHOLD
SUPPLY PRESSURE VALUE — 320

GENERATE NOTIFICATION — 325

METHODS AND SYSTEMS FOR ESTIMATING GAS SUPPLY PRESSURE

TECHNICAL FIELD

The present application relates generally to gas chromatography.

BACKGROUND

Gas chromatography (GC) is used to analyze and detect the presence of many different substances in a sample. The function of a gas chromatograph is to separate the components of a chemical sample, known as analytes, and detect the identity and/or the concentration of those components. The separation is frequently accomplished using a capillary GC column. In some instances, this column is essentially a piece of fused silica tubing with a stationary phase coating on the inside that interacts with the sample to separate the components. A pressurized gas, known as the mobile phase, is used to push the sample through the column. The GC column can remain isothermal throughout an analysis or be ramped in temperature.

SUMMARY

Measuring the pressure of a tank or other pressurized gas source coupled with a GC system or gas chromatograph can be costly and complex. The solutions described herein can provide a method for estimating gas supply pressure without adding additional hardware to the GC system.

At least one aspect of the present disclosure is directed to a method for estimating gas supply pressure of a gas chromatography system. The method can include measuring a runtime valve duty cycle for a valve of the GC system. The method can include estimating a runtime supply pressure from the runtime valve duty cycle and at least one of a runtime flow rate or downstream pressure based on one or more calibration valve duty cycles corresponding to one or more calibration supply pressures and one or more calibration flow rates or the downstream pressure. The method can include, responsive to determining the runtime supply pressure is greater than a threshold supply pressure value, generating a notification that the runtime supply pressure is greater than the threshold supply pressure value.

Another aspect of the present disclosure is directed to a gas chromatography system. The system can include a valve. The system can include an electronic pneumatic control module. The electronic pneumatic control module can measure a runtime valve duty cycle for the valve. The electronic pneumatic control module can estimate a runtime supply pressure from the runtime valve duty cycle and at least one of a runtime flow rate or downstream pressure based on one or more calibration valve duty cycles corresponding to one or more calibration supply pressures and one or more calibration flow rates or the downstream pressure. The electronic pneumatic control module can, responsive to determining the runtime supply pressure is greater than a threshold supply pressure value, generate a notification that the runtime supply pressure is greater than the threshold supply pressure value.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
FIG. 1 is a schematic diagram of a GC system in accordance with an embodiment.
Figure 1:
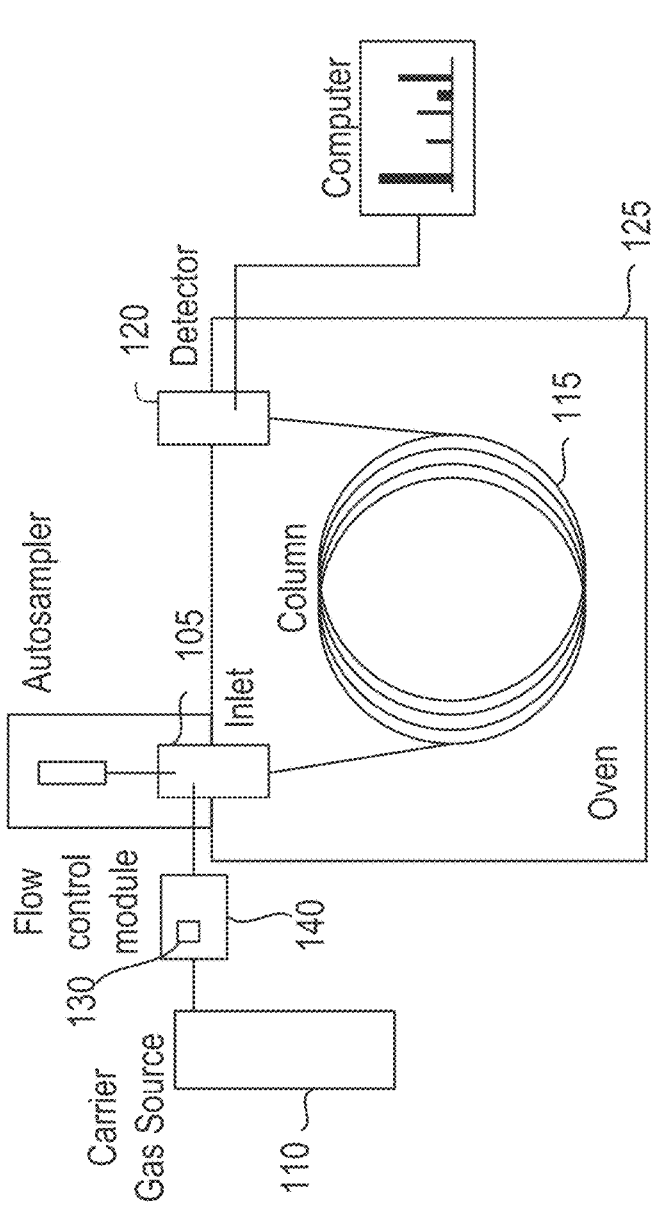

Following below are more detailed descriptions of various concepts related to, and implementations of, methods, apparatuses, and systems for estimating supply pressure (e.g., gas supply pressure). The various concepts introduced above and discussed in greater detail below may be implemented in any of a number of ways, as the described concepts are not limited to any particular manner of implementation. Examples of specific implementations and applications are provided primarily for illustrative purposes.

A GC system can be coupled with a tank or other pressurized gas source which supplies a gas to the GC system. Supply gases can be pressurized gases supplied to injection ports and detectors of a GC system. For example, these gases could be carrier gases providing flow through the injection port through the GC column and other flow path components of the GC system, such as helium, nitrogen, hydrogen, an argon/methane mixture, or other generally inert gases. These gases could also include fuel gases, (e.g., air or hydrogen Hydrogen) and make-up gases and/or reference gases (e.g., inert gases similar to the carrier gases listed above) provided to the detector for proper operation of the detector. One or more gases may be supplied to each injection port or detector. Measuring the precise pressure (e.g., supply pressure) of the pressurized gas source supplying gas(es) to an injection port or detector of the GC system can be a challenge. For example, the system can have a sensor that is external to the GC system to provide the pressure of the pressurized gas source. An additional external sensor can increase the cost and complexity of the GC system. Additionally, an external sensor may not be able to interface with the GC system in a manner to allow the GC system to take action if the supply pressure is over a defined threshold.

The present disclosure is directed to methods and systems for estimating gas supply pressure. During calibration of the electronic pneumatic control module, the valve duty cycle needed to achieve a known flow rate or known downstream pressure at a known supply pressure can be recorded. The recorded valve duty cycle corresponding to various supply pressures at a given flow rate, along with the measured runtime valve duty cycle and at least one of the runtime flow rate or downstream pressure, can be used during operation of the GC system to estimate gas supply pressure at runtime.

The disclosed solutions have a technical advantage of detecting whether the supply pressure is over or outside specification. For example, if the supply pressure is above the pressure specification for proper operation of the valve(s) on the gas supply flow path(s) to the GC system, the valve can lose its ability to control the gas flow into the GC system. This can allow additional supply gas to flow through the GC system, resulting in wasted gas. The solutions can provide an estimated supply pressure of the gas, which can show that the actual pressure of the pressurized gas source is either within or outside the specifications for proper valve operation. The solutions can provide the estimated gas supply pressure without adding additional hardware to the GC system. The solutions can prevent over-pressurized gas from flowing through the valve.

FIG. 1 is a schematic diagram of a GC system 100. The GC system 100 can include a representative GC system. The GC system 100 can include one or more injection ports 105 (e.g., inlet, sample inlet). The injection port 105 can receive a sample injected into the GC system 100 for analysis. For example, the sample can be injected into the injection port 105 where, if not already in a gaseous state, it is vaporized into the gaseous state for analysis by the GC system 100.

The GC system 100 can include one or more pressurized gas sources 110 (e.g., pressurized gas supply, gas source, gas supply, supply gas). The pressurized gas source 110 can include a tank. The pressurized gas source 110 (e.g., carrier gas supply, carrier gas source, carrier gas) can be fluidly (e.g., fluidically) coupled with (e.g., connected to) the injection port 105. The pressurized gas source 110 can supply a carrier gas, such as but not limited to, helium, hydrogen, nitrogen, an argon/methane mixture, or other such inert gas, that transports the injected sample from the injection port 105 through the GC system 100. The pressurized gas source 110 can include a source of pressurized gas. The pressurized gas source 110 can be a gas distribution system of pressurized gases. The pressurized gases can be found in a laboratory. The pressurized gas source 110 can include multiple gases. The pressurized gas source 110 can be coupled with the GC system 100 via a distribution panel.

The GC system 100 can include one or more electronic pneumatic control (EPC) modules 140 (e.g., flow control modules). The electronic pneumatic control module 140 can be coupled with (e.g., connected to) the pressurized gas source 110. The electronic pneumatic control module 140 can be fluidly coupled with the injection port 105. For example, the injection port 105 can be attached to the electronic pneumatic control module 140. The electronic pneumatic control module 140 can control the flow and/or pressure of the injection port 105. The carrier gas can go to a first electronic pneumatic control module 140 before going to the injection port 105. The electronic pneumatic control module 140 can use one or more calibration values or curves to estimate the gas supply pressure. The calibration values or curves can be generated during production of the electronic pneumatic control module 140 and/or GC system 100. For example, the calibration value(s) or curve(s) can be generated by setting a flow rate, setting the supply pressure to a value, and then recording the duty cycle at that value of supply pressure. This process may be repeated for additional supply pressures yielding additional duty cycles as needed to calibrate the valve. This process can be repeated for different flow rates until the range of allowable flow rates are exhausted. The calibration value(s) or curve(s) can be stored. The calibration curves can be generated for each different gas type. The calibration value(s) or curve(s) can be generated for each valve in the GC system 100. Calibration modules including multiple calibration values or curves can be stored on the electronic pneumatic control module 140. Each inlet can have its own electronic pneumatic control module 140. Each electronic pneumatic control module 140 can be coupled with the same gas supply or different gas supplies. The electronic pneumatic control module 140 can measure the runtime valve duty cycle.

The GC system 100 can include one or more columns 115. The column 115 can be fluidly coupled with the injection port 105. The column 115 can be selected from a wide variety of columns utilized to achieve separation of components of a sample by gas chromatography. GC systems configured for backflushing, detector splitting, or other pneumatic switching can include multiple columns. The carrier gas can transport the sample to the column 115 for separation. The column 115 can separate the components of the gaseous sample to produce one or more analytes of interest for analysis by the GC system 100. The column 115 can include a capillary column and/or may include fused silica tubing with a coating (e.g., stationary phase coating) on the inner portions of the tubing that interacts with the sample injected into the injection port 105 to separate the components of the sample. Dimensions of the column 115 can include an inner diameter range of 50 microns to 530 microns and a length range of 1 meter to 200 meters. The injection port 105 can provide samples to the column 115.

The GC system 100 can include one or more detectors 120. The detector 120 can receive the separated components (e.g., analytes of the sample) after the sample is transported through the column 115. The detector 120 can be fluidly coupled with the column 115. The detector 120 can analyze the separated sample components to detect the presence and/or the quantity of sample analytes separated by the column 115. The detector 120 can include a flame ionization detector (FID), a mass selective detector (MSD), a thermal conductivity detector (TCD), an electron capture detector (ECD), a nitrogen phosphorus detector (NPD), a sulfur chemiluminescence detector (SCD), a nitrogen chemiluminescence detector (NCD), a flame photometric detector (FPD), or a helium ionization detector (HID), among others.

The detector 120 can be fluidly coupled with the electronic pneumatic control module 140. For example, the detector 120 can be attached to the electronic pneumatic control module 140. The electronic pneumatic control module 140 can control the flow and/or pressure of the gas going to the detector 120. The gas can originate from the pressurized gas source 110. The pressurized gas source 110 can be fluidly coupled with the detector 120. The pressurized gas source 110 supplied to the detector 120 can include make-up gas, reference gas, air, or any other inert gas. The pressurized gas source 110 supplied to the detector 120 can add flow to the detector 120. The pressurized gas source 110 supplied to the detector 120 can provide fuel to light a flame, such as in an FID. Each detector 120 can have its own electronic pneumatic control module 140.

The GC system 100 can include one or more column heaters 125. The column heater 125 can include an oven, a convection heater, a conduction heater, an air bath, or other such heating device for heating certain GC system components. The column heater 125 can heat or cool the column 115 and other flow path components to desired temperatures. The column heater 125 can be configured to heat the column 115 such that the column 115 remains isothermal during sample analysis.

The GC system 100 can include one or more controllers 130. The controller 130 can be communicably connected, directly or indirectly, to the detector 120, the column heater 125, the injection port 105, one or more sensors, and/or other components of the GC system 100. The controller 130 can be an onboard computing component that is physically incorporated into the housing of the GC system 100 (e.g., GC system housing) that contains the column 115, detector 120, column heater 125, and other components of the GC system 100. The controller 130 can be one or more separate computing devices and/or other such controlling devices that are internal and/or external to the GC system housing. The controller 130 or a portion of the controller 130 can reside within the electronic pneumatic control module 140. For example, the controller 130 or a portion of the controller 130 can be disposed in the electronic pneumatic control module 140. The controller 130 or a portion of the controller 130 can reside within the GC system 100. For example, the controller 130 or a portion of the controller 130 can be disposed in the GC system 100. The controller 130 can be split between multiple locations. The controller 130 can be disposed outside of the electronic pneumatic control module. The controller 130 can be disposed outside of the GC system 100. The controller 130 can calculate or estimate the runtime supply pressure. The controller 130 can estimate the runtime supply pressure from the runtime duty cycle and at least one of the runtime flow rate or downstream pressure. The controller 130 can compare the estimated runtime supply pressure to the threshold supply pressure value. The controller 130 can, responsive to determining the runtime supply pressure is greater than a threshold supply pressure value, generate a notification that the runtime supply pressure is greater than the threshold supply pressure value.

The controller 130 can include one or more processors, such as but not limited to, a single-core processor, a multi-core processor, a logic device, or other such data processing circuitry, configured to execute, analyze, and process data and information of the GC system 100. The controller 130 can include a non-transitory memory device communicably connected to the processor. The memory device may be configured as a volatile memory device (e.g., SRAM and DRAM), a non-volatile memory device (e.g., flash memory, ROM, and hard disk drive), or any combination thereof. The memory device may store executable code and other such information that is generated and/or processed by the processor during operation of the GC system 100.

The GC system 100 can include one or more input/output devices communicably connected to the controller 130. The input/output device can enable an operator and/or user to receive information from the controller 130 and to input information and parameters into the controller 130. Such information and parameters can be stored in the memory device, accessed by the processor, and output to the input/output device. For example, the input/output device can include a monitor, display device, touchscreen device, keyboard, microphone, joystick, dial, button, or other such device to enable input and output of information and parameters. The input/output device may be utilized to input information into the controller 130 and output or otherwise display information and data generated by the processor of the GC system 100.

Figure 2:
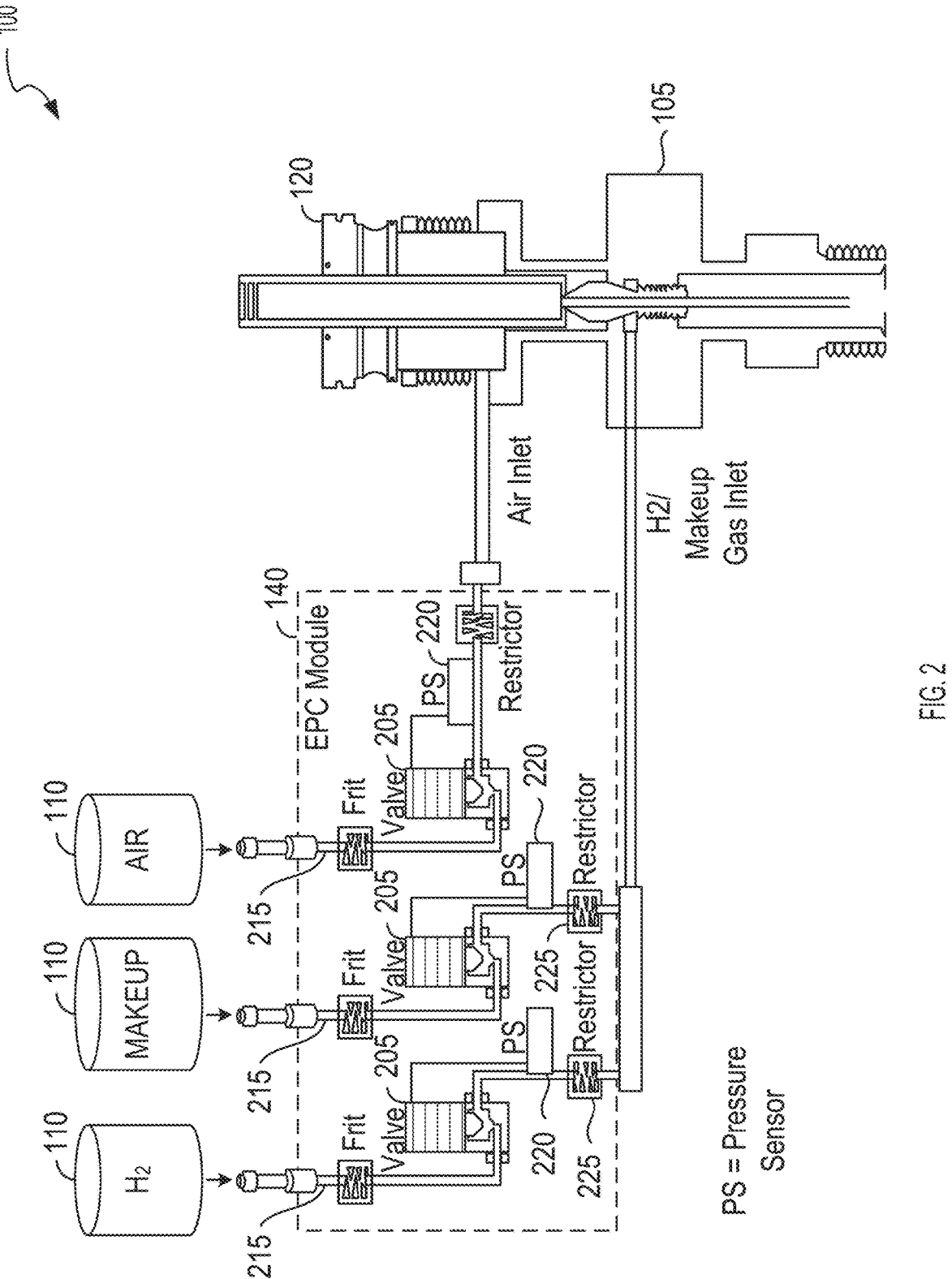
FIG. 2 is a schematic diagram of an electronic pneumatic control module and a detector of a GC system in accordance with an embodiment.

FIG. 2 is a schematic diagram of the electronic pneumatic control module 140 and the detector 120 of the GC system 100. The electronic pneumatic control module 140 can control the flow of gases to the detector(s) and/or injection port(s) of the GC system 100 and can include a separate flow path 215 for each type of gas fluidically connected to the electronic pneumatic control module 140. The flow path 215 may include a valve 205. The valve 205 can be fluidly coupled with the pressurized gas source 110. The valve 205 can be fluidly coupled with the detector 120. For example, the valve 205 can control the passage of gas from the pressurized gas source 110 to the detector 120 through the flow path 215. The valve 205 can receive gas from the pressurized gas source 110. For example, the valve 205 can receive $H_2$ gas, makeup gas, or air, among others, from the pressurized gas source 110. The makeup gas can include nitrogen or helium. One or more pressure sensors 220 can be disposed downstream of the valve 205. The pressure sensor 220 can measure the downstream pressure of the gas flowing from the valve 205 to the detector 120. The valve 205 can dynamically control the flow of gas to the detector 120 using the downstream pressure measured by the pressure sensor 220 downstream of the valve 205, the pressure of the detector 120, and a known restriction (e.g., restrictor 225) between the pressure sensor 220 downstream of the valve 205 and the detector 120. The duty cycle of the valve 205 can control the flow of gas to the detector 120. The duty cycle can be defined as the percentage of time the valve is turned on or getting a certain control signal. If the supply pressure of the gas upstream of the valve 205 is above a certain pressure, the valve 205 may not work properly. For example, the valve 205 may not be able to close if the gas supplied to the valve 205 is above a specified threshold value for the GC system 100. The specified pressure can be 120 psi, for example. The supply pressure threshold may be specified by the manufacturer of the valve 205. The GC system 100 can be free of pressure sensors disposed upstream of the valve 205. The valves 205 of the GC system 100 can be different types of valves. Each valve 205 can have a different supply pressure threshold value, rather than having one single threshold value for the GC system 100.

The pressure sensor 220 downstream of the valve 205 may not be able to measure the pressure upstream of the valve 205 (e.g., upstream pressure or supply pressure). In some cases, the pressure sensor 220 downstream of the valve 205 cannot measure the pressure upstream of the valve 205 because there are restrictions (e.g., tubing, channels in the EPC modules, frits, etc.) in the flow path between the supply gas and the pressure sensor 220 downstream of the valve 205. The valve 205 can provide restriction even when fully open. Therefore, pressure downstream of the valve 205 may not be exactly the same as the supply pressure. The pressure sensor 220 downstream of the valve 205 may only be able to measure the pressure downstream of the valve 205 (e.g., downstream pressure). The downstream pressure may not be representative of the supply pressure. The downstream pressure can be different from the supply pressure. The downstream pressure alone, without knowledge of the valve duty cycle and/or calibration curves, may not be sufficient to determine the supply pressure.

The GC system 100 can include one or more electronic pneumatic control modules 140. The electronic pneumatic control module 140 can include the controller 130. The controller 130 can be separate from the electronic pneumatic control module 140. The electronic pneumatic control module 140 can include a portion of the controller 130. The electronic pneumatic control module 140 can measure a runtime valve duty cycle for the valve 205. The electronic pneumatic control module 140 can estimate a runtime supply pressure from the runtime valve duty cycle and at least one of the runtime flow rate or downstream pressure based one or more calibration valve duty cycles corresponding to one or more calibration supply pressures and one or more calibration flow rates or the downstream pressure. For example, the electronic pneumatic control module 140 can estimate a runtime supply pressure from the runtime valve duty cycle and the at least one of the runtime flow rate or downstream pressure based on one or more calibration valve duty cycles corresponding to one or more calibration supply pressures at one or more calibration flow rates or calibration downstream pressures. A diagnostic procedure can use a single calibration flow rate. For example, the diagnostic procedure in which a mode of a set flow rate that is the same as the calibration flow rate is entered can use a single calibration flow rate. This can eliminate the need to calibrate for more than one flow rate, potentially reducing calibration complexity and time. A diagnostic procedure can use a single calibration downstream pressure. For example, the diagnostic procedure in which a mode of a set flow rate that is the same as the calibration downstream pressure is entered can use a single calibration downstream pressure. The downstream pressure can be the pressure of the gas downstream of the valve 205. The downstream pressure can depend on flow rate, gas type, restriction, pressure and/or temperature.

The electronic pneumatic control module 140 can determine that the runtime supply pressure is greater than, less than, or equal to a threshold supply pressure value. The threshold supply pressure value can be in a range of 130 psi to 200 psi, for example. The threshold supply pressure value can be specified based on the valve manufacturer's recommendation. The threshold supply pressure value can include a factor of safety (e.g., safety factor) beyond the manufacturer's recommendation. The safety factor can reduce or eliminate false positives. The electronic pneumatic control module 140 or the GC system 100 can generate a notification responsive to the runtime supply pressure being greater than, less than, or equal to the threshold supply pressure value.

The electronic pneumatic control module 140 can include an EEPROM. For example, the EEPROM can store each of the one or more calibration valve duty cycles corresponding to a respective calibration supply pressure of the one or more calibration supply pressures for each flow rate. The EEPROM can store each of the one or more calibration valve duty cycles corresponding to a respective calibration supply pressure of the one or more calibration supply pressures and a respective calibration flow rate of the one or more calibration flow rates or the downstream pressure. The EEPROM can store each of the one or more calibration valve duty cycles corresponding to the respective calibration supply pressure of the one or more calibration supply pressures and the downstream pressure. The electronic pneumatic control module 140 can estimate the runtime supply pressure from a calibration value, table, and or curve. The valve 205 can be disposed in the electronic pneumatic control module 140. For example, the valve 205 can be disposed in the electronic pneumatic control module 140 of the GC system 100. Each of the one or more electronic pneumatic control modules 140 can have more than one gas, flow path, or valve 205. The electronic pneumatic control module 140 can control the flow to the detector 120 or the injection port 105.

The GC system 100 can include the pressurized gas source 110. The pressurized gas source 110 can be external to the electronic pneumatic control module 140. The pressurized gas source 110 can be fluidly coupled with the valve 205. The pressurized gas source 110 can hold a gas. For example, the pressurized gas source 110 can hold $H_2$ gas, makeup gas, or air, among others. The pressurized gas source 110 can provide gas to the GC system 100. For example, the pressurized gas source 110 can provide gas to the detector 120. The pressurized gas source 110 can provide pressurized gas to the GC system 100. For example, the pressurized gas source 110 can provide pressured $H_2$ gas, pressured makeup gas, or pressured air to the GC system 100. The pressurized gas source 110 can be a gas distribution system. For example, the pressurized gas source 110 can be a gas distribution system of pressurized gases.

The GC system 100 can include the detector 120. The detector 120 can be fluidly coupled with the column 115. The detector 120 can receive sample analytes and carrier gas from the column 115. The detector 120 can also be fluidly coupled with the valve 205. For example, the detector 120 can be fluidly coupled with the valve via the flow path 215 through the electronic pneumatic control module 140. The valve 205 can be disposed upstream of the detector 120. For example, the valve 205 can be disposed upstream of the detector 120 of the GC system 100. The detector 120 can be disposed downstream of the valve 205. The valve 205 can be disposed in the electronic pneumatic control module 140. For example, the valve 205 can be disposed in the electronic pneumatic control module 140 of the GC system 100. The valve 205 can be disposed in the flow path 215 connecting the supply gas to the detector 120.

In some embodiments, the GC system 100 includes the injection port 105 (e.g., inlet). The injection port 105 can be coupled with the electronic pneumatic control module 140. For example, the injection port 105 can be attached to the electronic pneumatic control module 140. Each detector 120 can have a corresponding electronic pneumatic control module 140. Each injection port 105 can have a corresponding electronic pneumatic control module 140. The electronic pneumatic control module 140 corresponding to the detector 120 can be different from or the same as the electronic pneumatic control module 140 corresponding to the injection port 105. The electronic pneumatic control module 140 can use one or more calibration curves, tables, or values to estimate the gas supply pressure. The systems and methods of the present disclosure can be used for the electronic pneumatic control module 140 to provide gas flow to the injection port 105. The injection port 105 can be fluidly coupled with the valve 205. The injection port 105 can provide samples to the column 115.

Figure 3:
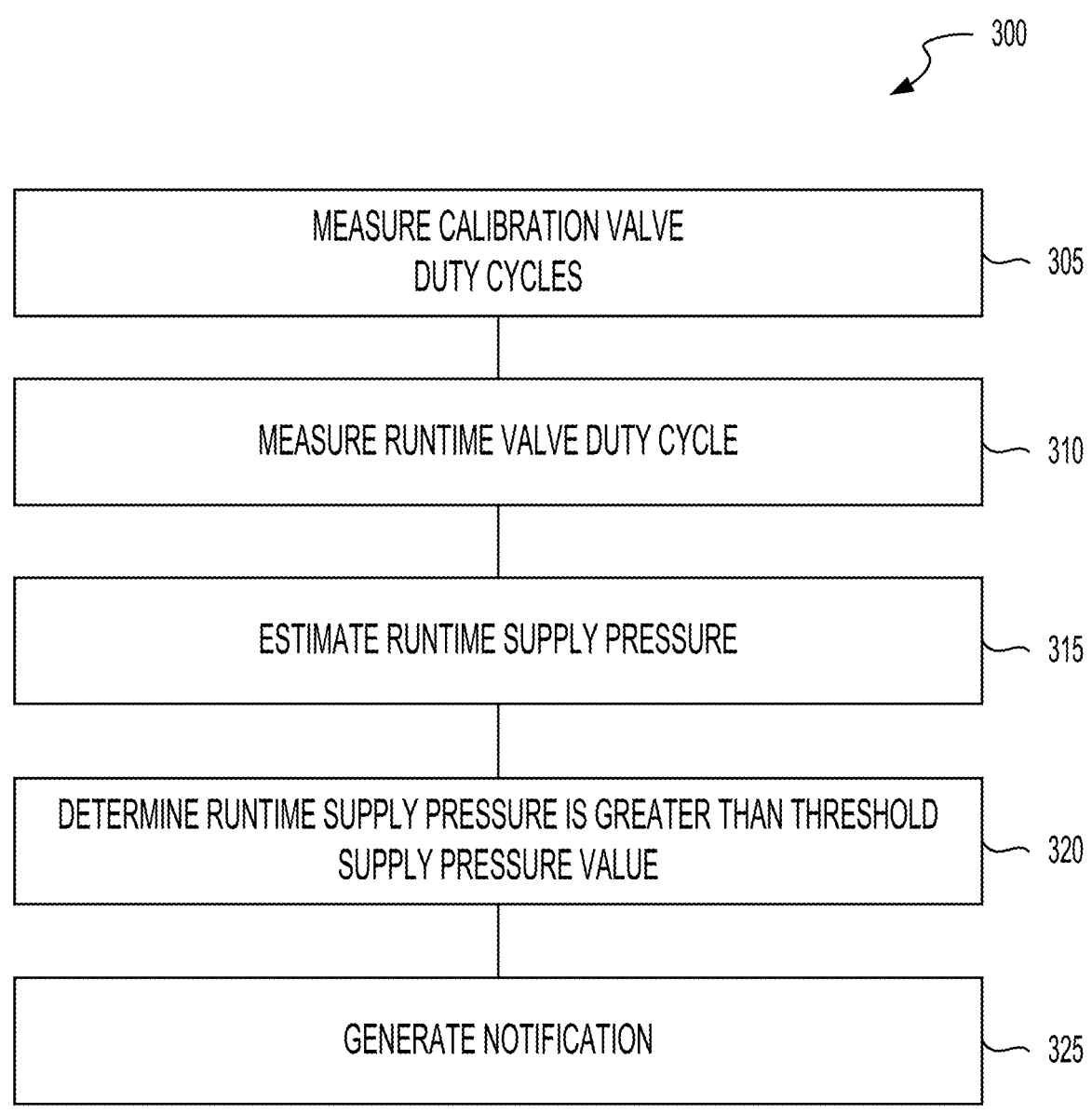
FIG. 3 is a schematic flow diagram illustrating a method for estimating gas supply pressure in accordance with an embodiment.

FIG. 3 is a schematic flow diagram illustrating a method 300 for estimating gas supply pressure. For example, the method 300 can include estimating gas supply pressure of the GC system 100. The method 300 for estimating supply pressure can include a diagnostic procedure. In brief summary, the method 300 can include measuring calibration valve duty cycles (BLOCK 305). The method 300 can include measuring a runtime valve duty cycle (BLOCK 310). The method 300 can include estimating a runtime supply pressure (BLOCK 315). The method 300 can include determining the runtime supply pressure is greater than the threshold supply pressure value (BLOCK 320). The method 300 can include generating a notification (BLOCK 325).

The method 300 can include measuring calibration valve duty cycles (BLOCK 305). For example, the method 300 can include measuring one or more calibration valve duty cycles. The calibration valve duty cycles can include duty cycle values of the valve 205. For example, the calibration valve duty cycles can include duty cycle values measured during calibration of the valve 205. The one or more calibration valve duty cycles can be measured to calibrate the valve 205. For example, the one or more calibration valve duty cycles can be measured before the GC system 100 is at a customer site (e.g., lab), for example, when the GC system 100 is being built in production. The method 300 can include measuring the one or more calibration valve duty cycles, each of the one or more calibration valve duty cycles corresponding to a one or more calibration supply pressures and one or more calibration flow rates or the downstream pressure. The calibration supply pressures can include known pressures. For example, the calibration supply pressures can include known supply pressures used during calibration of the valve 205. The method 300 can include measuring the one or more calibration valve duty cycles corresponding to the one or more calibration supply pressures and the one or more calibration flow rates or the downstream pressure.

If the method 300 uses flow rate, the valve 205 may need to be calibrated for multiple types of gases if that channel allows for different types of gases. In some embodiments, the downstream pressure could be used instead of flow rate. This could allow for the use of a single calibration for any type of gas. If the method 300 is running a diagnostic procedure, a single flow rate or the downstream pressure can suffice for calibration.

The method 300 can include calibrating the valve 205. During calibration of the valve 205 or before calibration of the valve 205, a population of representative valves can be obtained and an equation with parameters to describe the relationship between the valve duty cycle and supply pressure at certain flow rate(s) or downstream pressure(s) can be obtained. To calibrate each individual valve, the duty cycle at different flow rate(s) or downstream pressure(s) and supply pressure(s) can be measured to generate these parameters for that particular valve. Then during runtime, this equation can be used to relate the runtime valve duty cycle to the runtime supply pressure at the runtime flow rate in order to estimate the runtime supply pressure. The relationship between the valve duty cycle and supply pressure can be linear.

During calibration of a single valve, a table of supply pressures and valve duty cycles, can be generated for one or more flow rates or downstream pressures. Then during runtime, the runtime flow rate or downstream pressure, runtime valve duty cycle, and this calibration table can be used to estimate the runtime supply pressure using the table and/or interpolation.

The method 300 can include measuring each of the one or more calibration valve duty cycles needed (e.g., required) to achieve a target flow rate or target downstream pressure at respective calibration supply pressures. For example, the one or more calibration valve duty cycles to achieve a target flow rate at known supply pressures can be measured. The target flow rate can include the flow rate of gas passing through the valve 205 from the pressurized gas source 110. The flow rate can be any flow rate used to measure the one or more calibration valve duty cycles corresponding to the one or more calibration supply pressures. The flow rate can be in a range of 0 mL/min to 100 mL/min. For example, the flow rate can be 30 mL/min.

The method 300 can include storing each of the one or more calibration valve duty cycles corresponding to the respective calibration supply pressure of the one or more calibration supply pressures and to a respective calibration flow rate of the calibration flow rates. For example, the method 300 can include storing each of the one or more calibration valve duty cycles corresponding to the respective calibration supply pressure of the one or more calibration supply pressures and to the respective calibration flow rate of the calibration flow rates in the electronic pneumatic control module 140. The method 300 can include storing each of the one or more calibration valve duty cycles corresponding to the respective calibration supply pressure of the one or more calibration supply pressures and to the downstream pressure. The method 300 can include storing each of the one or more calibration valve duty cycles corresponding to the respective calibration supply pressure of the one or more calibration supply pressures and to the downstream pressure in the electronic pneumatic control module 140.

The method 300 can include storing each of the one or more calibration valve duty cycles corresponding to the respective supply pressure of the one or more calibration supply pressures for each given calibration flow rate. The method 300 can include storing each of the one or more calibration valve duty cycles corresponding to the respective calibration supply pressure of the one or more calibration supply pressures and to the respective calibration flow rate of the calibration flow rates or the downstream pressure in an electronic pneumatic control module EEPROM of the GC system 100. The method 300 can include storing each of the one or more calibration valve duty cycles corresponding to the respective calibration supply pressure of the one or more calibration supply pressures and to the respective calibration flow rate of the calibration flow rates in an EEPROM of the electronic pneumatic control module 140. The one or more calibration valve duty cycles corresponding to the respective calibration supply pressure of the one or more calibration supply pressures and to the respective calibration flow rate of the calibration flow rates can be stored in a map or a table. The method 300 can include storing, by the controller 130 or the electronic pneumatic control module 140, each of the one or more calibration valve duty cycles corresponding to the respective calibration supply pressure of the one or more calibration supply pressures and to the respective calibration flow rate of the calibration flow rates. There may be multiple valves 205 for each electronic pneumatic control module 140. There may be multiple electronic pneumatic control modules 140 for each GC system 100. Calibration data can be collected and stored for each valve 205.

The method 300 can include measuring a runtime valve duty cycle (BLOCK 310). For example, the method 300 can include measuring the runtime valve duty cycle for the valve 205. The method 300 can include measuring the runtime valve duty cycle for the valve 205 of the GC system 100. The runtime valve duty cycle can be measured at the customer site. The runtime valve duty cycle can be measured any time after the valve 205 has been calibrated. The method 300 can include measuring, by the controller 130 or the electronic pneumatic control module 140, the runtime valve duty cycle.

The method 300 can include estimating a runtime supply pressure (BLOCK 315). For example, the method 300 can include estimating the runtime supply pressure from the runtime valve duty cycle and at least one of a runtime flow rate or downstream pressure. The method 300 can include estimating the runtime supply pressure from the runtime valve duty cycle and the at least one of the runtime flow rate or downstream pressure based on the one or more calibration valve duty cycles corresponding to the one or more calibration supply pressures and the one or more calibration flow rates or the downstream pressure. The runtime supply pressure can be estimated by estimating the calibration supply pressure corresponding to the calibration valve duty cycle that is equal to or close to the runtime valve duty cycle. The method 300 can include estimating, by the controller 130 or the electronic pneumatic control module 140, the runtime supply pressure. The electronic pneumatic control module 140 can estimate a runtime supply pressure from the runtime valve duty cycle and the at least one of the runtime flow rate or downstream pressure based on one or more calibration valve duty cycles corresponding to a one or more calibration supply pressures at one or more calibration flow rates or the downstream pressure. The downstream pressure can be the pressure of the gas downstream of the valve 205. The downstream pressure can depend on flow rate, gas type, restriction, pressure and/or temperature.

A plurality of valves can be measured to determine the curves (e.g., calibration curves). The calibration curve may be a linear curve, or it could be more complex. Then, at manufacturing time for a given electronic pneumatic control module 140, measurements can be taken to determine the specific values of the curve for the specific electronic pneumatic control module 140. At runtime, the stored calibration values, the known curve(s), and the duty cycle at a known flow rate can be used to estimate the supply pressure. The method 300 can include characterizing a relationship between the valve duty cycle and the supply pressure with a parameterized equation. The parameterized equation can include an equation with parameters to describe the relationship between the valve duty cycle and supply pressure at a certain flow rate or downstream pressure. The equation can be used to relate the runtime valve duty cycle to the runtime supply pressure at the runtime flow rate or runtime downstream pressure in order to estimate the runtime supply pressure. The method 300 can include estimating the runtime supply pressure from a calibration table (e.g., look-up table). The calibration table can include values for supply pressure (e.g., calibration supply pressure), valve duty cycle (e.g., calibration valve duty cycle), and flow rate (e.g., calibration flow rate) or downstream pressure (e.g., calibration downstream pressure). Each valve can have a linear calibration curve with the same slope. The linear calibration curves for these valves can be separated by an offset. The offset for each valve can be determined to calibrate the relationship between supply pressure and duty cycle.

The estimated runtime supply pressure can be the estimated supply pressure of the pressurized gas source 110. For example, the estimated runtime supply pressure can be the estimated supply pressure of the pressurized gas source 110 located at the customer site. The actual runtime supply pressure can be the actual supply pressure of the pressurized gas source 110. A difference between the actual supply pressure and the estimated runtime supply pressure can be less than 20 psi. For example, the difference between the actual supply pressure and the estimated runtime supply pressure can be less than 20 psi, less than 19 psi, less than 18 psi, less than 17 psi, less than 16 psi, less than 15 psi, less than 14 psi, less than 13 psi, less than 12 psi, less than 11 psi, less than 10 psi, less than 9 psi, less than 8 psi, less than 7 psi, less than 6 psi, less than 5 psi, less than 4 psi, less than 3 psi, less than 2 psi, or less than 1 psi. The actual supply pressure can be greater or less than the estimated runtime supply pressure by less than 20 psi, less than 19 psi, less than 18 psi, less than 17 psi, less than 16 psi, less than 15 psi, less than 14 psi, less than 13 psi, less than 12 psi, less than 11 psi, less than 10 psi, less than 9 psi, less than 8 psi, less than 7 psi, less than 6 psi, less than 5 psi, less than 4 psi, less than 3 psi, less than 2 psi, or less than 1 psi. The difference between the actual supply pressure and the estimated runtime supply pressure can be less than 5 psi for an actual supply pressure in a range of 80 psi to 170 psi. The difference between the actual supply pressure and the estimated runtime supply pressure can be less than 7 psi for an actual supply pressure in a range of 150 psi to 175 psi. The method 300 can include estimating, by the controller 130 or the electronic pneumatic control module 140, the runtime supply pressure. The method 300 can include estimating the actual supply pressure without directly measuring the actual supply pressure (e.g., with a sensor).

The method 300 can include determining the runtime supply pressure is greater than the threshold supply pressure value (BLOCK 320). For example, the method 300 can include determining that the runtime supply pressure is greater than the threshold supply pressure value. The method 300 can include determining that the runtime supply pressure is less than the threshold supply pressure value. The method 300 can include determining that the runtime supply pressure is equal to the threshold supply pressure value. The method 300 can include determining that the threshold supply pressure value is greater than, less than, or equal to the runtime supply pressure. The method can include determining, by the controller 130 or the electronic pneumatic control module 140, that the runtime supply pressure is greater than, less than, or equal to the threshold supply pressure value.

The threshold supply pressure value can be in a range of 130 psi to 200 psi. For example, the threshold supply pressure value can be in a range of 130 psi to 135 psi, 130 psi to 140 psi, 130 psi to 145 psi, 130 psi to 150 psi, 130 psi to 155 psi, 130 psi to 160 psi, 130 psi to 165 psi, 130 psi to 170 psi, 130 psi to 175 psi, 130 psi to 180 psi, 130 psi to 185 psi, 130 psi to 190 psi, 130 psi to 200 psi, 135 psi to 140 psi, 135 psi to 145 psi, 135 psi to 150 psi, 135 psi to 155 psi, 135 psi to 160 psi, 135 psi to 165 psi, 135 psi to 170 psi, 135 psi to 175 psi, 135 psi to 180 psi, 135 psi to 185 psi, 135 psi to 190 psi, 135 psi to 200 psi, 140 psi to 145 psi, 140 psi to 150 psi, 140 psi to 155 psi, 140 psi to 160 psi, 140 psi to 165 psi, 140 psi to 170 psi, 140 psi to 175 psi, 140 psi to 180 psi, 140 psi to 185 psi, 140 psi to 190 psi, 140 psi to 200 psi, 145 psi to 150 psi, 145 psi to 155 psi, 145 psi to 160 psi, 145 psi to 165 psi, 145 psi to 170 psi, 145 psi to 175 psi, 145 psi to 180 psi, 145 psi to 185 psi, 145 psi to 190 psi, or 145 psi to 200 psi.

The threshold supply pressure value can be in a range of 150 psi to 175 psi. For example, the threshold supply pressure value can be in a range of 150 psi to 155 psi, 150 psi to 160 psi, 150 psi to 165 psi, 150 psi to 170 psi, 150 psi to 175 psi, 155 psi to 160 psi, 155 psi to 165 psi, 155 psi to 170 psi, 155 psi to 175 psi, 160 psi to 165 psi, 160 psi to 170 psi, 160 psi to 175 psi, 165 psi to 170 psi, 165 psi to 175 psi, or 170 psi to 175 psi.

The method 300 can include generating (e.g., providing, producing) a notification (BLOCK 325). For example, the method 300 can include generating the notification responsive to the runtime supply pressure being greater than the threshold supply pressure value. The method 300 can include, responsive to determining the runtime supply pressure is greater than the threshold supply pressure value, generating a notification that the runtime supply pressure is greater than the threshold supply pressure value. The notification can include a notification that the runtime supply pressure is greater than the threshold supply pressure value.

The method 300 can include generating the notification responsive to the runtime supply pressure being less than the threshold supply pressure value. For example, the method 300 can include generating a notification that the GC system 100 passes one or more diagnostic tests responsive to the runtime supply pressure being less than the threshold supply pressure value. The notification can include a notification that the runtime supply pressure is less than the threshold supply pressure value. The method 300 may not include generating a notification for passing results if the GC system 100 is undergoing continuous monitoring. The method 300 can include, responsive to determining that the runtime supply pressure is less than the threshold supply pressure value, generating a notification that the runtime supply pressure is less than the threshold supply pressure value. The method 300 can include not generating a notification responsive to the runtime supply pressure being less than the threshold supply pressure value.

The method 300 can include generating the notification responsive to the runtime supply pressure being equal to the threshold supply pressure value. The notification can include a notification that the runtime supply pressure is equal to the threshold supply pressure value. The method 300 can include, responsive to determining that the runtime supply pressure is equal to the threshold supply pressure value, generating a notification that the runtime supply pressure is equal to the threshold supply pressure value. The method 300 can include not generating a notification responsive to the runtime supply pressure being equal to the threshold supply pressure value.

The GC system 100 or the electronic pneumatic control module 140 can generate the notification. The method 300 can include generating the notification responsive to the estimated supply pressure being greater than the threshold supply pressure value. The method 300 can include generating the notification responsive to the estimated supply pressure being less than or equal to the threshold supply pressure value. The method 300 can include generating the notification responsive to a difference between the estimated supply pressure and the threshold supply pressure value being greater than a threshold difference. The notification can warn the user that the actual supply pressure is likely greater than specification. The threshold supply pressure value can be higher than the specified pressure for the GC system 100. The threshold supply pressure value can be higher than the specified pressure such that the notification is not generated when the estimated supply pressure is less than the specified pressure. If the runtime supply pressure is greater than the threshold supply pressure value and the configured gas is $H_2$, an $H_2$ shutdown can be raised. The $H_2$ shutdown can turn off all heated zones. The method 300 can include turning off one or more heated zones (e.g., for $H_2$) responsive to the runtime supply pressure being greater than the threshold supply pressure value.

The method 300 can include generating the notification. The notification can include at least one of a light, a message, a beep, a text, or an email. The notification can alert a user of the GC system 100 that the actual supply pressure is over specification, outside of specification, or over pressure. For example, the notification can alert the user that components upstream of the valve 205 are not working as intended. For example, the notification can alert the user that one or more regulators upstream of the valve 205 may not be working. The notification can alert the user that the components upstream of the valve 205 are running outside of specification. The notification can include displaying a message on a display of the GC system 100. The notification can include sending a text or email. The notification can include setting or changing the color of a status light. The notification can include providing an audio notification (e.g., providing a beep). The notification can appear or be displayed in a browser (e.g., web browser) interface for the GC system 100. The notification can appear or be displayed in a data system interface.

Further operation of the GC system 100 can be stopped (e.g., paused, halted) responsive to the runtime supply pressure being greater than the threshold supply pressure value. The method 300 can include generating, by the controller 130 or the electronic pneumatic control module 140, the notification if the runtime supply pressure is greater than the threshold pressure. If the GC system 100 is running hydrogen, the column heaters 125 can be disabled responsive to the runtime supply pressure being greater than the threshold supply pressure value.

The method 300 can include continuing GC system operation if the runtime supply pressure is not greater than the threshold supply pressure value. For example, the method 300 can include continuing GC system operation if the estimated supply pressure is not greater than the threshold supply pressure value. The method 300 can include continuing GC system operation if the estimated supply pressure is less than the threshold supply pressure value. If the threshold pressure is greater than the estimated supply pressure, the GC system 100 can continue operating without generating a notification. The method 300 can include continuing operation of the GC system 100 if the runtime supply pressure is not greater than the threshold supply pressure value.

Calibration can take place at a variety of flow rates or downstream pressures because gas channels can be set to various flow rates or downstream pressures during use by the user or the GC system 100. The calibration can account for different flow rates or downstream pressures if there is continuous monitoring of the supply pressure during the operation of the GC system 100 (e.g., during a GC analysis or when the system is idle between analyses).

The valve 205 can be calibrated at different supply pressures at a single flow rate. During runtime, a diagnostic procedure can be implemented in which GC system 100 can be in a state dedicated to estimating the supply pressure. For example, the diagnostic procedure can be implemented during initial installation, during startup, or during any other chosen time. The GC system 100 can set the flow rate or downstream pressure to the flow rate or downstream pressure used during calibration for the duration of the diagnostic procedure. When the GC system 100 is done estimating the supply pressure, the flow rate could then be changed to a different value for analysis. The estimation process does not need to use the flow rate since there may be only one flow rate possible for that particular valve. The diagnostic procedure could be run by the user choosing to run the diagnostic procedure, for example, by pushing or clicking a button to start it. The GC system 100 can run the diagnostic procedure automatically and/or continuously as the GC system 100 turns on, begins a troubleshooting procedure, or is sitting idle between runs. The GC system 100 can run the diagnostic procedure during any of the opportunities where the flow rate could be changed to the calibration flow rate and not interfere with what the instrument is doing. The GC system 100 can run the diagnostic procedure at user-specified flow rates or downstream pressures. In this case, the GC system 100 can be calibrated for each of the user-specified flow rates, the downstream pressure, or downstream pressures. The method 300 can include implementing a diagnostic procedure. For example, the method 300 can include implementing a diagnostic procedure at a specified flow rate (e.g., single chosen flow rate).

In some embodiments, the diagnostic procedure can be run as a user-initiated action outside of normal workflows. In this setup the GC system 100 can specify a known flow rate. Therefore, calibration information for one flow rate in the EEPROM can be stored. The user or the GC system 100 can set the flow rate setpoint. The GC system 100 can use this flow rate setpoint, the gas type, the temperature, and the restrictor parameters to calculate the downstream pressure setpoint. When the GC system 100 has this downstream pressure setpoint, the GC system 100 can use the valve 205 to control to this setpoint and give a valve duty cycle. Therefore, instead of using the flow rate directly to estimate the supply pressure, this flow rate setpoint can be converted to a downstream pressure setpoint and the downstream pressure setpoint can be used in calibration and in estimating the supply pressure (along with using the valve duty cycle). This could decouple the calibration and estimation process from the type of gas being used since that would be calculated out when converting from flow rate to downstream pressure. In this case, this may not require knowing the configured gas or calibrating for multiple gases for those channels that can be connected to different types of supply gases.

The method 300 can be used for an electronic pneumatic control module 140 attached to an injection port 105 or inlet. The method 300 can be used for an electronic pneumatic control module 140 attached to a detector 120. The method 300 can be used for an electronic pneumatic control module 140 supplying gas to pneumatic switching devices (e.g., active detector splitters, backflushing devices, Dean's switches, etc.) and/or to autosamplers (e.g., headspace devices or gas sampling valves).

Figure 4:
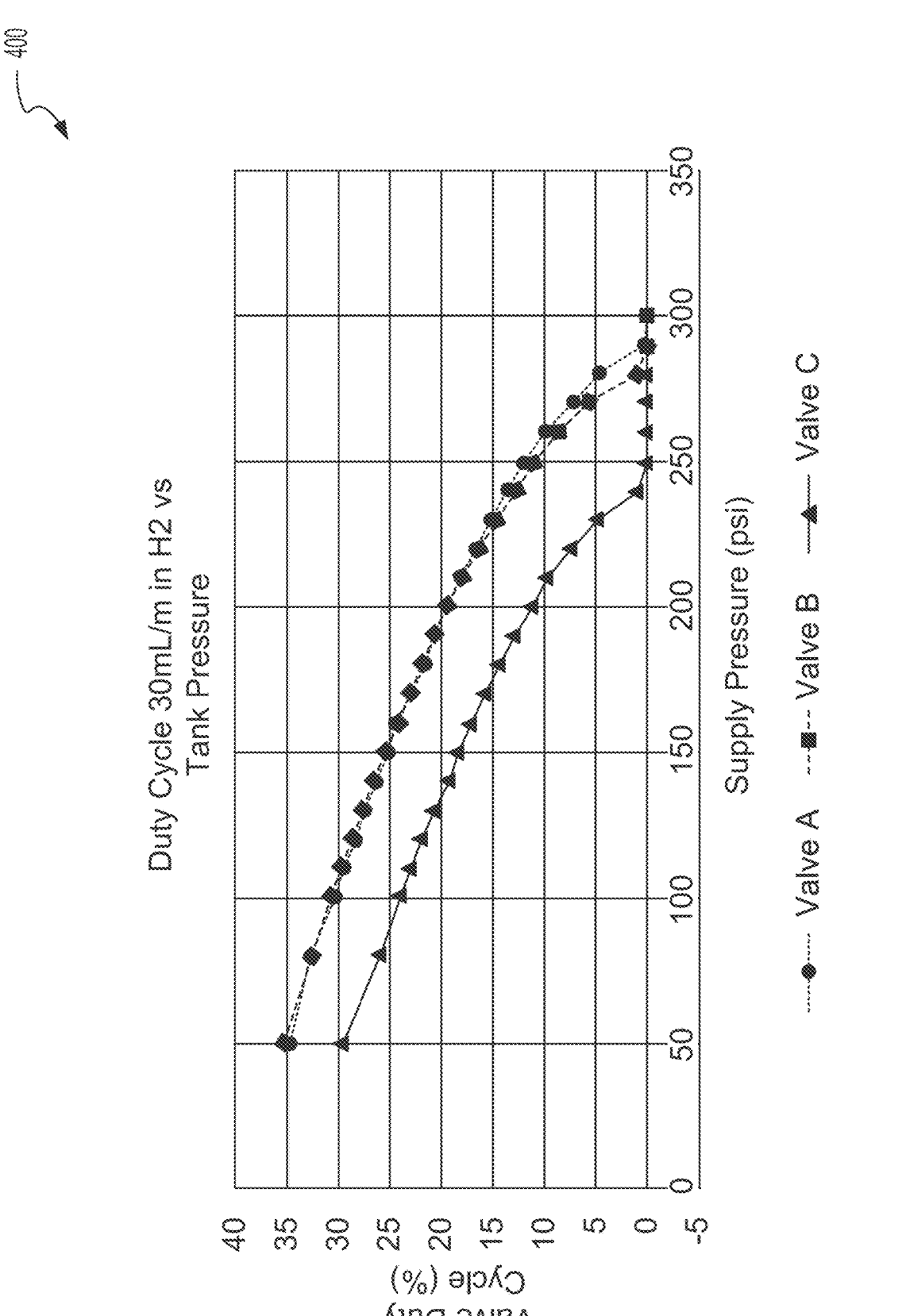
FIG. 4 is a plot of valve duty cycle vs. supply pressure in accordance with an embodiment.

FIG. 4 is a plot 400 of valve duty cycle (%) vs. supply pressure (psi). The duty cycle can include calibration valve duty cycles at a specified flow rate for a specified gas. The supply pressure can include calibration supply pressures. The duty cycle (e.g., valve duty cycle) can be defined as how open or closed the valve 205 is to provide a certain flow rate. The valve duty cycle can depend on the supply pressure and the setpoint of the flow rate (e.g., flow rate setpoint). The flow rate setpoint can include the calibration flow rate. The duty cycle needed to achieve a flow rate of 30 mL/min of $H_2$ gas for a known supply pressure can be plotted against known supply pressures of the gas. The duty cycle needed to achieve a flow rate of 30 mL/min of $H_2$ gas for a known pressure can have a roughly linear relationship over a specified working range of the valve 205. Above a threshold value, the relationship between the supply pressure and the valve duty cycle can cease to be a linear relationship. The valve duty cycle can be lower (e.g., the valve 205 is less open) if the pressurized gas source pressure is higher. Valve A, Valve B, and Valve C all behave similarly in terms of the shape of the curve and can be characterized by a parameterized function over a specified pressure window.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random-access memory or both. The elements of a computer are a processor for performing actions in accordance with instructions and one or more memory devices for storing instructions and data. A computer can include or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software, or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output, lights (e.g., instrument status lights), and speakers or other sound generating devices for audible presentation of output. For example, the status light can change to red in addition to or as an alternative to displaying a text message to the user on the display. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:
measuring, by a controller, a runtime valve duty cycle for a valve of a gas chromatography (GC) system;
estimating, by the controller, a runtime supply pressure from the runtime valve duty cycle and at least one of a runtime flow rate or downstream pressure based on one or more calibration valve duty cycles corresponding to one or more calibration supply pressures and one or more calibration flow rates or the downstream pressure; and
responsive to determining the runtime supply pressure is greater than a threshold supply pressure value, generating, by the controller, a notification that the runtime supply pressure is greater than the threshold supply pressure value.

2. The method of claim 1, further comprising determining, by the controller, that the runtime supply pressure is less than or equal to the threshold supply pressure value.

3. The method of claim 2, further comprising generating, by the controller, a notification that the runtime supply pressure is less than or equal to the threshold supply pressure value.

4. The method of claim 1, further comprising measuring, by the controller, the one or more calibration valve duty cycles corresponding to the one or more calibration supply pressures and the one or more calibration flow rates or the downstream pressure.

5. The method of claim 1, further comprising storing, by the controller, each of the one or more calibration valve duty cycles corresponding to a respective calibration supply pressure of the one or more calibration supply pressures and to a respective calibration flow rate of the one or more calibration flow rates or the downstream pressure in a memory of the GC system.

6. The method of claim 1, wherein:
the runtime supply pressure is an estimated supply pressure; and
a difference between an actual supply pressure and the runtime supply pressure is less than 20 psi.

7. The method of claim 1, wherein the valve is disposed in an electronic pneumatic control module of the GC system.

8. The method of claim 1, wherein the valve is disposed upstream of an injection port of the GC system.

9. The method of claim 1, wherein the valve is disposed upstream of a detector of the GC system.

10. The method of claim 1, further comprising estimating the runtime supply pressure from a calibration table.

11. The method of claim 1, further comprising characterizing a relationship between the valve duty cycle and the supply pressure with a parameterized equation.

12. The method of claim 1, wherein the valve is fluidly coupled with a pressurized gas source.

13. The method of claim 1, further comprising implementing a diagnostic procedure at a specified flow rate or the downstream pressure.

14. The method of claim 1, wherein the threshold supply pressure value is in a range of 130 psi to 200 psi.

15. The method of claim 1, further comprising measuring each of the one or more calibration valve duty cycles required to achieve a target flow rate or target downstream pressure at a respective calibration supply pressure of the one or more calibration supply pressures.

16. The method of claim 1 further comprising turning off one or more heated zones responsive to the runtime supply pressure being greater than the threshold supply pressure value.

17. The method of claim 1, wherein a pressure sensor is disposed downstream of the valve.

18. The method of claim 1, wherein the notification comprises at least one of a light, a message, a beep, a text, or an email.

19. A gas chromatography (GC) system, comprising:
a valve; and
a controller of an electronic pneumatic control module configured to:
measure a runtime valve duty cycle for the valve;
estimate a runtime supply pressure from the runtime valve duty cycle and at least one of a runtime flow rate or downstream pressure based on one or more calibration valve duty cycles corresponding to one or more calibration supply pressures and one or more calibration flow rates or the downstream pressure; and
responsive to determining the runtime supply pressure is greater than a threshold supply pressure value, generate a notification that the runtime supply pressure is greater than the threshold supply pressure value.

20. The GC system of claim 19, wherein the electronic pneumatic control module further comprises a memory configured to store each of the one or more calibration valve duty cycles corresponding to a respective calibration supply pressure of the one or more calibration supply pressures and a respective calibration flow rate of the one or more calibration flow rates or the downstream pressure.

* * * * *